United States Patent [19]

Barefoot

[11] 3,976,532

[45] Aug. 24, 1976

[54] TREAD APPLYING MACHINE

[75] Inventor: Carlton K. Barefoot, Muncie, Ind.

[73] Assignee: Tred-X Corporation, Muncie, Ind.

[22] Filed: Dec. 23, 1974

[21] Appl. No.: 535,158

[52] U.S. Cl. .............................. 156/405; 156/96; 156/126
[51] Int. Cl.² ........................................ B29H 17/37
[58] Field of Search ............ 156/405 R, 406, 128 R, 156/128 I, 126, 96, 403, 408, 409, 410, 414, 415, 416, 417, 420, 418, 419, 123, 110 R, 132, 133, 394 R, 127

[56] References Cited
UNITED STATES PATENTS

| | | | |
|---|---|---|---|
| 1,455,260 | 5/1923 | Midgley | 156/126 |
| 1,577,928 | 3/1926 | Murray | 156/394 |
| 1,734,023 | 10/1929 | Smith | 156/126 |
| 2,381,379 | 8/1945 | Stevens | 156/405 X |
| 2,517,889 | 8/1950 | Kuffler | 156/126 |
| 2,717,022 | 9/1955 | Duerksen | 156/408 X |
| 2,965,152 | 12/1960 | Darr | 156/408 X |
| 3,151,013 | 9/1964 | Nebout | 156/405 |
| 3,332,820 | 7/1967 | Porter | 156/126 X |
| 3,556,900 | 1/1971 | Edney et al. | 156/403 |
| 3,761,340 | 9/1973 | Klein | 156/405 |
| 3,865,670 | 2/1975 | Habert | 156/126 |

OTHER PUBLICATIONS

B329,612, Jan. 1975, Edler, 156/96.

*Primary Examiner*—Douglas J. Drummond
*Assistant Examiner*—John E. Kittle
*Attorney, Agent, or Firm*—Richard D. Emch

[57] ABSTRACT

The disclosure is directed to a machine for applying an endless precured tire tread to a prepared tire casing. A tread assembly is mounted for movement along guide rods supported by a base. The tread assembly includes a rotatably mounted head assembly having finger assemblies which mount an endless precured tread. The finger assemblies are movable radially inwardly and outwardly. A tire mounting assembly is positioned on said base in opposed and aligned relationship to the head assembly and mounts a prepared tire casing. Rollers are provided for stitching the endless tread to the prepared casing.

10 Claims, 11 Drawing Figures

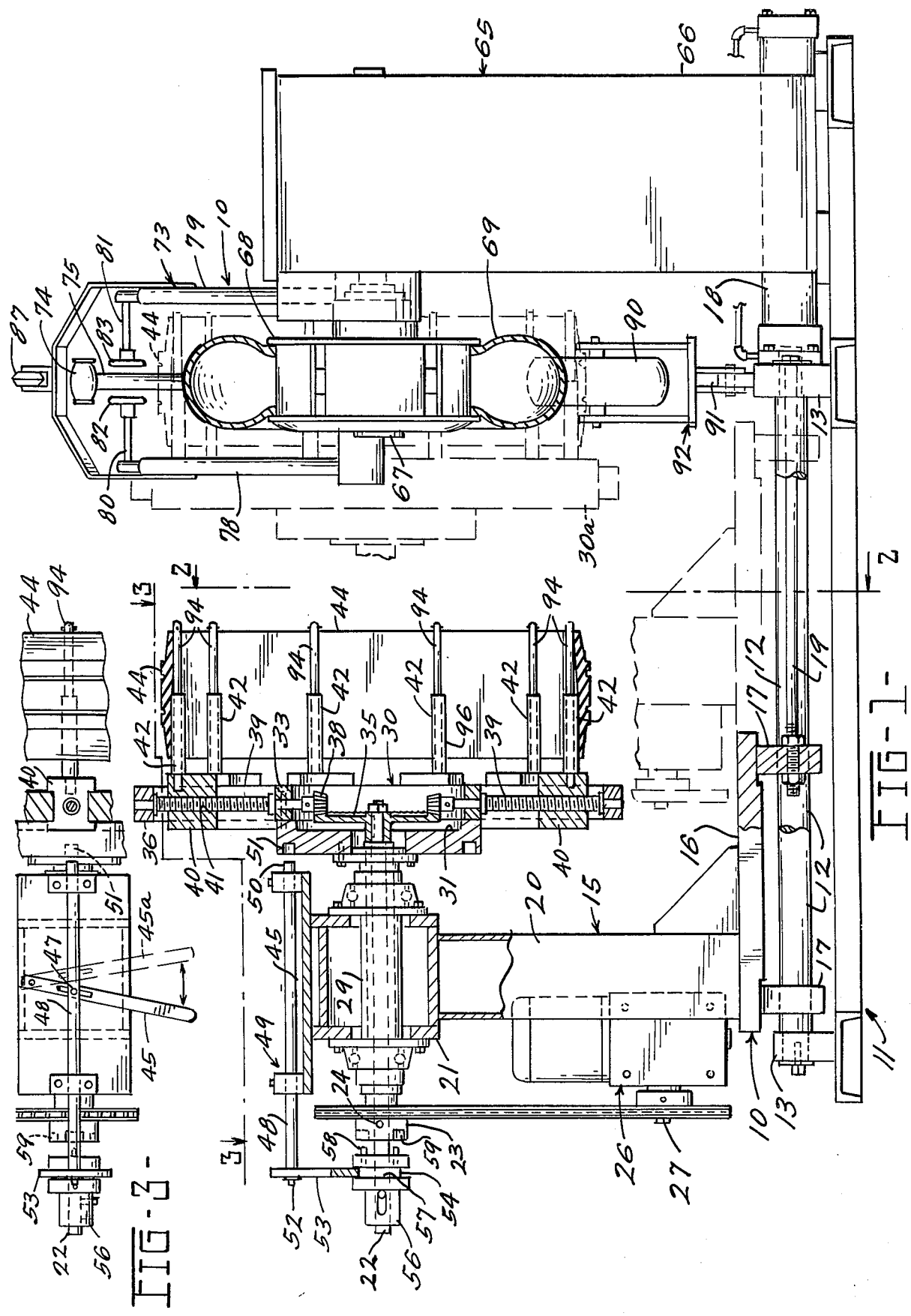

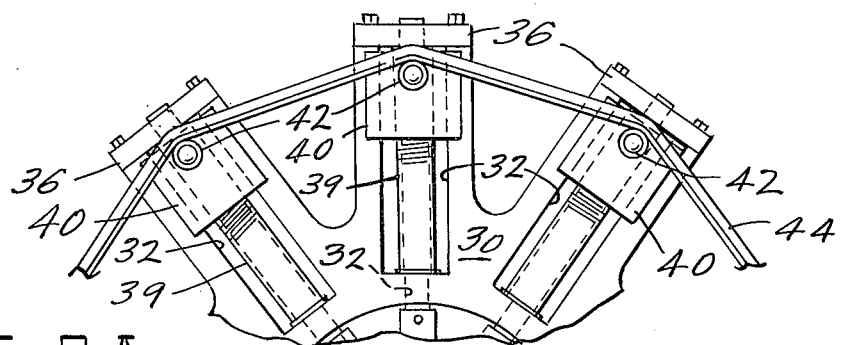
FIG-2A-
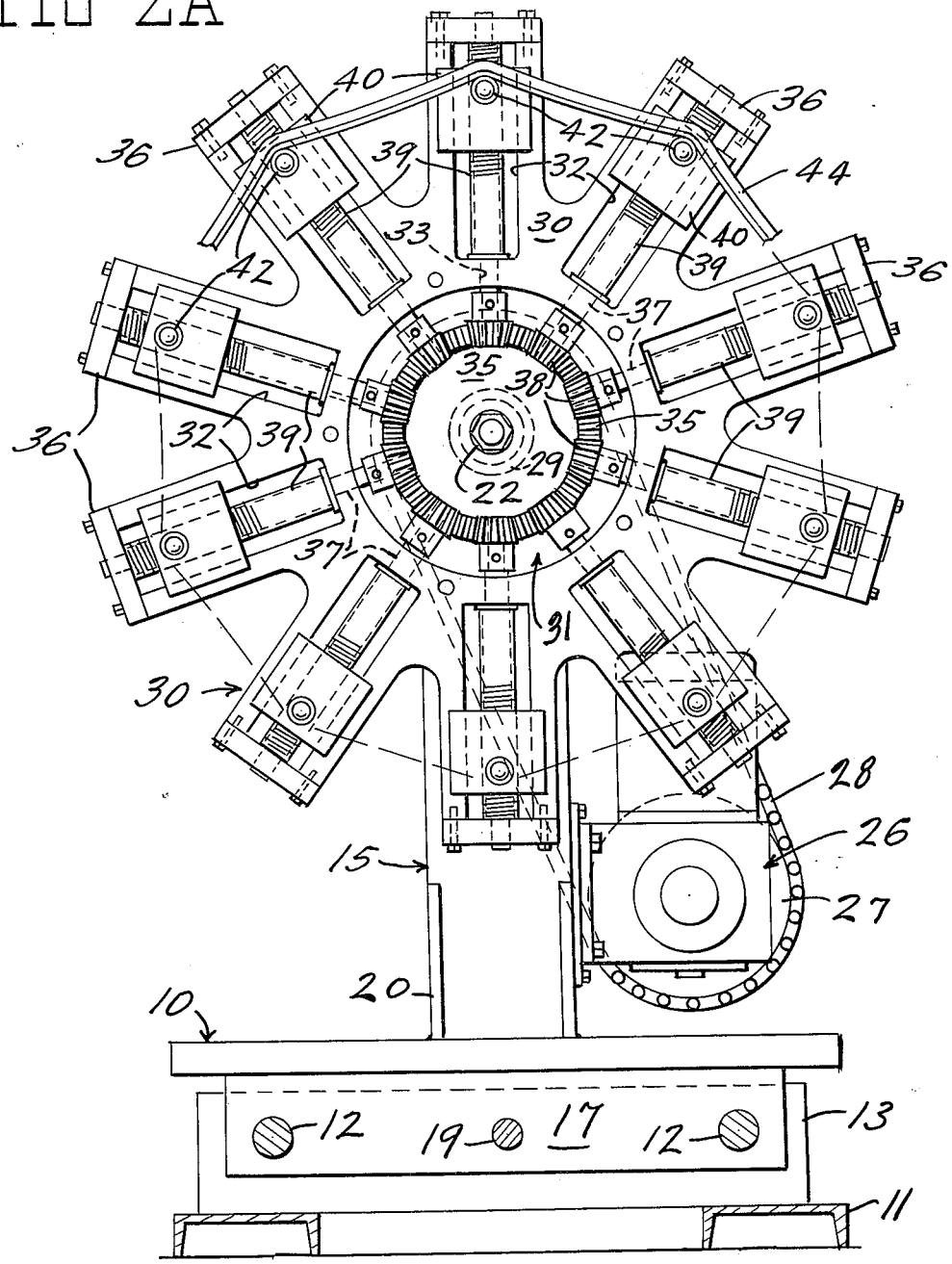
FIG-2-

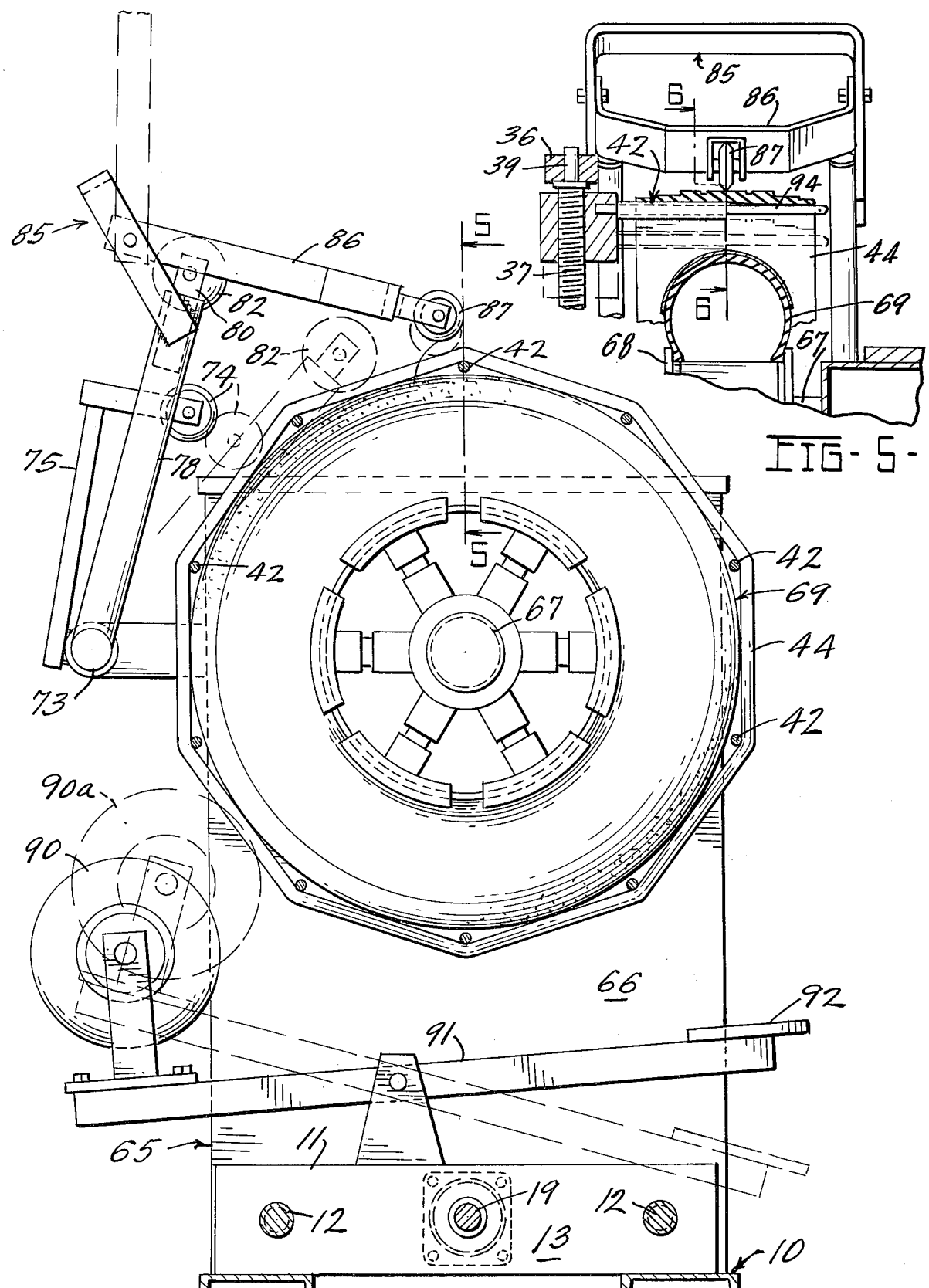

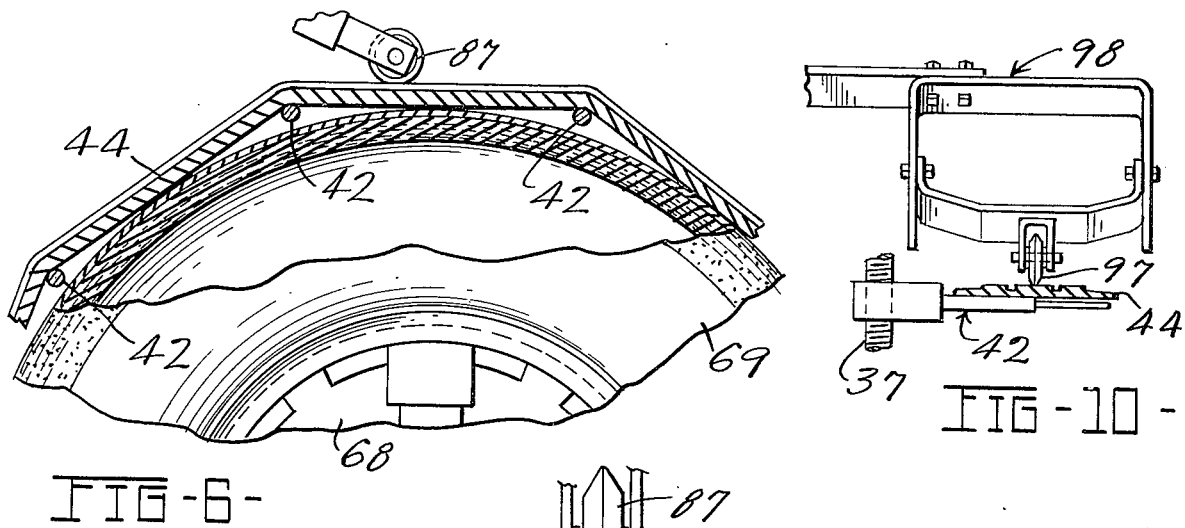
FIG-6-
FIG-10-
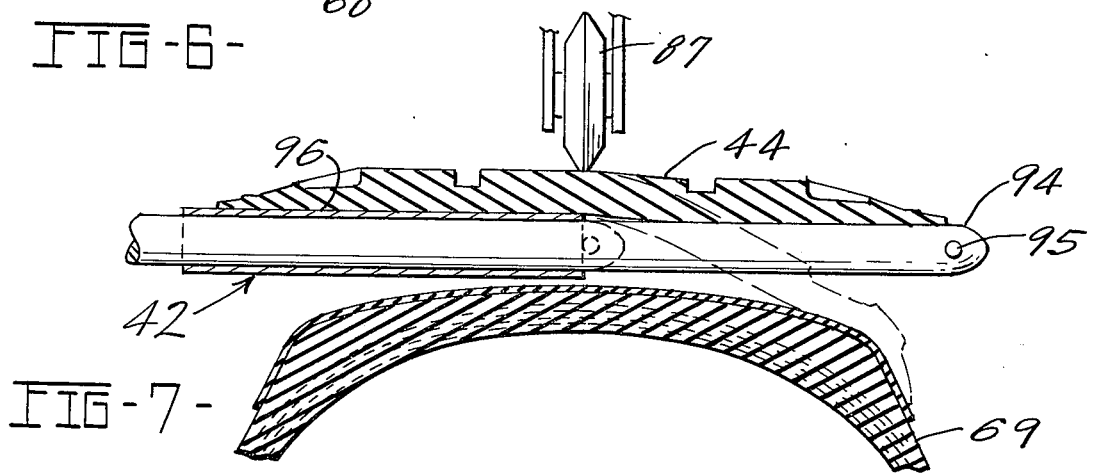
FIG-7-
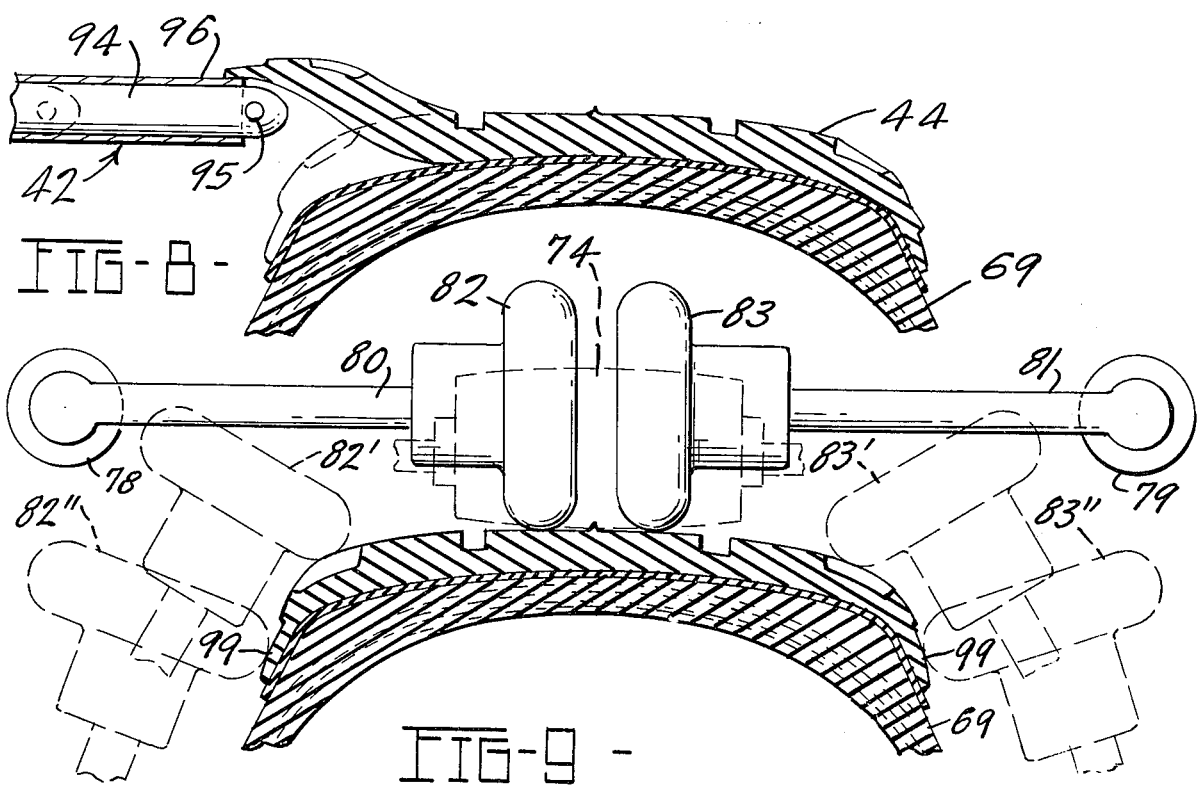
FIG-8-
FIG-9-

TREAD APPLYING MACHINE

BACKGROUND OF THE INVENTION

The present application relates to a machine for applying an endless precured tire tread to a prepared tire casing. An endless precured tire tread of the type utilized by the present machine is disclosed in Neal U.S. Pat. No. 3,815,651. This type of precured tire tread has the tread design premolded into the rubber and has been cured prior to its application on the casing.

In a commonly used prior art tire retreading operation, fixed matrices or molds are utilized to mold the new tread design into uncured rubber which has been secured to a prepared tire casing. Subsequently, the assembly is vulcanized to cure the tread rubber and bond it to the tire casing.

Because tire companies now produce many sizes, configurations and construction of tires, it has become less and less feasible for a tire retreader to have an inventory of the necessary fixed matrices with which to retread the many sizes of tires. In addition, tires having belted and radial constructions are relatively inflexible. This again requires a greater number of matrices to handle the various types of tires.

In recent years, the use of precured tread stock in retreading operations, particularly in connection with truck tires, has become more and more popular.

The machine which is the subject matter of the present invention is utilized to properly install an endless precured tread upon a prepared tire casing.

SUMMARY OF THE INVENTION

The present invention relates to a tread applying machine which is particularly adaptable for use in applying a precured endless replacement tread to a prepared tire casing during a retreading or tire rebuilding operation. The machine includes a base and has a tread assembly mounted for movement along said base. The tread assembly includes a rotably mounted head assembly which includes means for retaining the endless tread.

Tire mounting means are provided in opposed and aligned relationship with the head assembly for rotably mounting a prepared tire casing. The head assembly is moved into position such that the endless tread is positioned in centered and surrounding relationship with the prepared tire casing.

BRIEF DESCRIPTION OF THE DRAWINGS

FIG. 1 is a side elevational view, partially in cross section, of a tread applying machine according to the present invention and not showing a tread centering assembly;

FIG. 2 is a view taken along the line 2—2 of FIG. 1 and particularly showing the head assembly of the present invention;

FIG. 2A is a fragmentary view similar to FIG. 2 and showing the finger assemblies in different radial positions;

FIG. 3 is a fragmentary top view taken along the line 3—3 of FIG. 1;

FIG. 4 is a partially cross-sectional view showing the relative positions of the finger assemblies and the tire casing after the tread has been moved into surrounding relationship with the casing;

FIG. 5 is a fragmentary, cross-sectional view, taken along the line 5—5 of FIG. 4;

FIG. 6 is a fragmentary, cross-sectional view, taken along the line 6—6 of FIG. 5, shown on an enlarged scale;

FIG. 7 is an enlarged fragmentary, cross-sectional view, 90° removed from the FIG. 6 position;

FIG. 8 is a view similar to FIG. 7, showing the head assembly fingers being removed;

FIG. 9 is a view similar to FIG. 8, showing the stitching rollers; and

FIG. 10 is a fragmentary cross-sectional view showing a tread centering assembly.

DESCRIPTION OF THE PREFERRED EMBODIMENT

A tread applying machine, according to the present invention, is generally indicated by the reference number 10. The tread applying machine 10 includes a longitudinally extending base 11 which is, for example, constructed of structural steel members. A pair of longitudinal guide bars 12 extend between a pair of upstanding base supports 13, which are mounted on the base 11.

A tread assembly, generally indicated by the reference number 15, is mounted for movement along the base 11. The tread assembly 15 includes a bottom plate 16 having bearing members 17 depending therefrom. The bearing members 17 receive the guide bars 12. A cylinder 18 is mounted on one of the base supports 13 and has a rod 19 which is connected to one of the bearing members 17. The cylinder 18, which in the present embodiment is an air cylinder, is effective to move the tread assembly 15 along the base 11.

A pedestal 20 extends upwardly from the bottom plate 16 of the tread assembly 15 and mounts a bearing assembly 21. The bearing assembly 21 journals a tubular spindle which mounts a horizontal shaft 22. An idler pulley assembly 23 is mounted on the shaft 22 but is not connected to the shaft 22 and is free to rotate relative to the shaft 22. A pin 24 rides in a peripheral groove (not shown) in the shaft 22 and prevents translation of the pulley assembly 23 along the axis of the shaft 22.

A motor and gear box assembly 26 having an output pulley 27 is mounted on the pedestal 20. A drive belt 28 extends between the pulley assembly 23 and the output pulley 27.

The bearing assembly 21 also includes a tubular shaft 29. The shaft 22 is positioned within the tubular shaft 29. Referring to FIGS. 1 and 2, a head assembly 30 is mounted on the end of the tubular shaft 29. The head assembly 30 has a central hub opening 31 and a plurality of spaced radially extending slots 32. Radial bores 33 extend between the radially extending slots 32 and the hub opening 31. A central ring gear 35 is positioned within the hub opening 31 of the head assembly 30 and is mounted on the end of the shaft 22. Bearing plates 36 are mounted adjacent the outermost ends of the radially extending slots 32 and side shafts 37 are positioned within each of the slots 32. An individual bearing plate 36 and the respective one of the radial bores 33 mount each of the side shafts 37. Bronze bearings (not shown) are provided in both the bearing plates 36 and the radial bores 33. A pinion gear 38 is mounted on the inner ends of each of the side shafts 37 and mesh with the central ring gear 35. Rotation of the shaft 22 and its central ring gear 35 also rotates the individual pinion gears 38 and the respective side shafts 37.

A portion 39 of each of the side shafts 37 is threaded and the threaded portion 39 mounts a carrier 40. Referring to FIG. 1, each of the carriers 40 includes a mating threaded bore 41. A finger assembly 42 is carried by and extends outwardly from each carrier 40. The finger assembly extends parallel to the shaft 22, as shown in FIG. 1.

When the central ring gear 35 rotates in a first direction, the side shafts 37 are rotated and the carriers 40 and finger assemblies 42 move radially outwardly within the radially extending slots 32 of the head assembly 30. Similarly, when the central ring gear 35 is moved in an opposite direction, upon reversal of the motor 26, the finger assemblies 42 are moved radially inwardly.

When the tread assembly 15 is in the position shown in FIGS. 1 and 3, as explained above, there is no direct connection between the motor and gear box assembly 26 and the shaft 22. Therefore, the head assembly 30 is not rotating even though the motor and gear box assembly 26 are energized. At this time, the head assembly 30 may be rotated by hand, for example, when a precured endless tread 44 is initially positioned over the finger assemblies 42. To move the finger assemblies 42 radially inwardly or radially outwardly, a lever 45 (see FIG. 3) is moved forwardly to an engaged position 45a. The lever 45 is pivotally mounted and has an intermediate connection 47 to a longitudinally slidable rod 48. The rod 48 is mounted in a bracket assembly 49 which is supported on the bearing assembly 21.

When the lever 45 is moved to the position 45a, an end 50 of the rod 48 is moved into engagement with one of a plurality of socket openings 51 which are defined on the back of the head assembly 30. Once the end 50 is engaged in one of the sockets 51, the head assembly 30 is no longer free to rotate. The rod 48 also includes an opposite end 52 which mounts an arm 53 having a bifurcated lower end 54. A drive fitting 56 is pinned to the shaft 22 and includes a saddle 57 which receives the bifurcated lower end 54 of the arm 53. At least one drive pin 58 extends from the drive fitting 56 and mates with one of a plurality of socket openings 59 defined by the idler pulley assembly 23.

Upon movement of the lever 45 to the position 45a, the arm 53 moves the drive fitting 56 to the right, as viewed in FIG. 1, and the drive pin 58 is engaged in one of the socket openings 59. Because the drive fitting 56 is pinned to the shaft 22, there is now a drive connection between the pulley assembly 23 and the shaft 22. Therefore, the central ring gear 35 begins to rotate and, for example, the finger assemblies 42 are moved radially outwardly until the precured endless tread 44 is in its expanded position shown in FIG. 2A. To move the finger assemblies 42 radially inwardly, the polarity of the motor 26 is reversed, thus reversing the rotation of the shaft 22 and the central ring gear 35. To disengage the drive connection between the motor and gear box assembly 26 and the drive shaft 22, the lever 45 is moved to the left, as shown in FIG. 3, thus removing the drive pin 58 from one of the socket openings 59. At the same time, the end 50 of the rod 48 is removed from the engaged socket opening 51.

In another embodiment, not shown, the motor and gear box assembly 26 is eliminated and a handwheel is mounted adjacent the end of the shaft 22. Rotation of the handwheel moves the finger assemblies 42 inwardly or outwardly depending on the direction of rotation of the handwheel.

Referring to FIG. 1, a tire mounting assembly 65 is mounted on the base 11 in opposed relationship to the tread assembly 15. The tire mounting assembly 65 is very similar in construction to prior art tread builders, for example, the Model 3513A-2 tread builder sold by Salsbury Corporation. The tire mounting assembly 65 includes a pedestal housing 66 which houses a motor and belt pulley assembly (not shown) which drives a shaft 67. The shaft 67 rotably mounts an expandable chuck assembly 68. The chuck assembly 68 mounts a prepared tire casing, for example, a tire casing 69. Before being mounted on the chuck assembly, a worn tire is selected and its casing inspected to insure there are no defects such as nail holes present. The tire casing, after inspection, is buffed and a rubber vulcanizing cement is placed on its surface. After the tire casing 69 is mounted on the expandable chuck assembly 68, the buffed and cemented tire casing is inflated and expanded to its normal inflated diameter. The inflated casing 69 is then wrapped with a thin layer of uncured cushion gum. The cushion gum is .030 to .050 inch thick and covers the buffed cemented surface of the tire casing. The cushion gum layer is then stitched or rolled to the buffed cement surface.

A roller assembly 73 is mounted on the pedestal housing 66 and includes a spring biased stitching roller 74 which is mounted by an arm 75. A pair of side arms 78 and 79 rotably mount spring biased inner arms 80 and 81 which in turn mount side stitching rollers 82 and 83. A cylinder (not shown) moves the roller assembly 73 and the side arms 78 and 79 inwardly toward the tire casing 69.

A bracket assembly 85 is connected to the side arms 78 and 79 and pivotally mounts a center arm 86 having a center guide roller 87 mounted at its outer end. The center guide roller 87 is in direct alignment with the centerline of a tire casing 69 after it has been mounted on the expandable chuck assembly 68.

Referring to FIG. 4, a pressure roller 90 is rotably mounted at one end of a lever 91 which is pivotally connected to the base 11. A foot pad 92 is mounted on the opposite end of the lever 91 and the pressure roller 90 is movable between the solid line position shown in FIG. 4 to the dashed line position indicated by the reference number 90a. In the preferred embodiment the roller 90 comprises a small pneumatic tire.

Referring to FIGS. 1 and 7, the finger assemblies 42 include a rod 94 having a pin 95 at its free end and having its other end fixed to the carrier 40. A sleeve 96 surrounds the rod 94 and is movable along the rod 94.

During a normal operation of the tread applying machine 10, after the tire casing 69 is prepared and placed upon the expandable chuck assembly 68, as described above, the precured endless tread 44 is also buffed on its underside and a rubber vulcanization cement is applied to its underside. The precured endless tread 44 is then positioned on the finger assemblies 42 of the head assembly 30. Referring to FIG. 10, after the tread 44 is initially positioned on the assemblies 42, the tread 44 is expanded slightly to place the tread under a small amount of tension. The tread 44 is then moved to an aligned circumferential position, wherein the centerline of the tread 44 falls within a single predetermined plane which is perpendicular to the axis of the shaft 22. The position is checked by moving a guide roller 97 downwardly and moving the tread 44 until the entire tread centerline is aligned with the guide roller 97. The guide roller 97 is mounted by a bracket assembly 98 which is mounted on the pedestal 20.

Another method of aligning the tread 44 to insure the correct centerline alignment is to provide stops (not shown) on the finger assemblies 42 whereby the side edge of the tread 44 contacts the stops and the tread 44 centerline is automatically positioned.

The cylinder 18 is actuated and the rod 19 retracted thereby moving the tread assembly 15 to the right, as shown in FIG. 1, until the precured endless tread 44 surrounds and is correctly aligned with the tire casing 69, as shown in FIG. 4. This position is also indicated by the dashed line position 30a in FIG. 1.

The number of finger assemblies 42 must be carefully chosen. In the present embodiment, there are ten finger assemblies 42. Referring to FIG. 4, it is seen that the precured endless tread 44 forms essentially a straight line between adjacent ones of the finger assemblies 42 when the tread 44 is in its expanded condition adjacent the tire casing 69. When in this position, the tread 44 is essentially tangent to the tire casing at the midpoint between adjacent finger assemblies 42. To calculate the number of finger assemblies 42 required, the following formula may be used:

$$\cos A = \frac{R}{R + D + C} \quad (1)$$
$$N = \frac{180°}{A} \quad (2)$$

Where:
- R = Radius of tire casing;
- D = Diameter of the sleeve 96;
- C = Clearance factor between the casing and the sleeve;
- N = Number of assemblies.

While the above calculation is an approximation, it serves as a guide. If too many finger assemblies 42 are utilized, tangency of the endless tread 44 relative to the tire casing 69 is not approximated and it is not possible to temporarily attach the endless tread 44 to the tire casing 69, as will be explained below. On the other hand, if too few finger assemblies 42 are utilized, rather than having a tangency situation between the tread 44 and the mating casing 69, the tread intersects the tire casing 69 and it is not possible to move the head assembly 30 into position over the tire casing 69.

After the precured endless tread 44 is in the position relative to the tire casing 69, if desired, the center arm 86 can manually be moved downwardly until the center guide roller 87 is positioned as shown in FIGS. 5 and 7. The center guide roller 87 merely serves as a check to insure that the precured endless tread 44 and the prepared tire casing 69 are in correct alignment and that their centerlines are coincidental.

The tread 44 is then retracted by moving the finger assemblies 42 inwardly until the inside of the tread 44 contacts the outside of the tire 69. It is preferred to have as much of the tread as possible contact the tire and still not permit the finger assemblies 42 to touch the tire.

The operator then steps on the foot pad 92 and the pressure roller 90 is moved to the position 90a, as shown in FIG. 4. The drive unit of the tire mounting assembly 65 is actuated and the chuck assembly 68 begins to rotate slowly. The pressure roller 90 forces the endless tread 44 which is between the respective finger assemblies 42 against the tire casing 69 and tacks the two units together in correct alignment.

After the initial tacking operation, it is necessary to remove the finger assemblies 42 from their location between the precured endless tread 44 and the tire casing 69. The cylinder 18 is actuated and when the rod 19 is extended, the tread assembly 15 moves to the left, as shown in FIG. 1.

Referring to FIGS. 7 and 8, as this movement occurs, the rod 94 of the finger assemblies 42 slides to the left (as viewed in FIG. 7) while the sleeve 96 remains stationary. The sleeve 96 does not begin its movement until the pin 95 of the finger assembly 42 contacts the end of the sleeve 96. By this time, approximately one-half of the precured endless tread 44 and tread casing 69 assembly has been closely joined and the two components are fixed relative to one another. Continued movement of the tread assembly 15 pulls the remaining portion of the finger assembly 42 away from the combined endless tread 44 and tire casing 69, as shown in FIG. 8. It has been found that the structure of the present machine 10 results in an assembly which is centered correctly and that the friction drag of the finger assemblies does not misalign the components.

After the tread assembly 15 is moved away, the center stitching roller 74 is moved into position as indicated in FIGS. 8 and 9. At this time, the chuck assembly 68 is rotating at a relatively high speed and the centerline or crown stitching is completed. It is most important that all air bubbles be forced outwardly. The casing assembly cylinder then moves the two side stitching rollers 82 and 83 downwardly into position, as shown in FIG. 9. The spring biased arms 80 and 81 rotate relative to the side arms 78 and 79 and the rotation progressively moves the side stitching rollers 82 and 83 from their initial positions adjacent the ends of the center stitching roller 74 downwardly and they progressively stitch sidewalls 99 of the precured endless tread 44, thereby expelling any entrapped air from the tire assembly.

After stitching is completed, the roller assembly 73 returns to the position shown in FIG. 1 and the completed tire assembly may be removed from the tread applying machine 10 and vulcanized.

What I claim is:

1. A tread applying machine comprising, in combination, a base, a tread assembly mounted for movement on said base, said tread assembly including a head assembly mounted to rotate about an axis, said head assembly including means for retaining an endless tread, tire casing means for rotably mounting a prepared tire casing in opposed and axially aligned relationship with said head assembly for rotation about said axis, and roller means for joining a retained precured endless tread to a mounted prepared tire casing while such tread and casing are simultaneously rotated about said axis, whereby the precured endless tread can be initially tacked to such casing with pressure exerted by said roller means while such endless tread is retained on said head assembly.

2. A tread applying machine, according to claim 1, wherein said tread retaining means includes a plurality of parallel finger assemblies arranged in a circle concentric with said axis and mounted for radial movement.

3. A tread applying machine, according to claim 2, wherein each of said finger assemblies includes a longitudinal rod extending parallel to said axis and a sleeve mounted for movement on said rod.

4. A tread applying machine, according to claim 1, wherein said head assembly includes a plate member having a plurality of slots defined therein to extend radially from said axis, a side shaft mounted for rotation in each of such slots, said side shaft being at least partially threaded and having a pinion gear mounted at its inner end, a central gear mounted adjacent the center of said plate member and meshing with each of said pinion gears, a plurality of carriers with one of said carriers mounted for movement on each of said side shafts and a finger assembly mounted on each of said carriers.

5. A tread applying machine, according to claim 1, including cylinder means for moving said tread assembly on said base, whereby said tread assembly is movable toward and away from said tire casing means.

6. A tread applying machine, according to claim 5, wherein said tread assembly includes a shaft and drive means for rotating said shaft with respect to said head assembly, and means responsive to rotation of said shaft with respect to said head assembly for moving said finger assemblies radially inwardly or outwardly.

7. A tread applying machine, according to claim 6, wherein said drive means includes a reversible motor, an idler pulley means mounted on said shaft and driven by said motor, a drive fitting connected to said shaft and engageable with said idler pulley means and lever means for moving said drive fitting into and out of a driving relationship with said idler pulley means.

8. A tread applying machine, according to claim 1, wherein said tire casing means includes an expandable chuck assembly for mounting a prepared tire casing and the roller means includes a pressure roller mounted for movement towards and away from such casing, whereby a precured endless tread can be initially tacked to such casing with pressure exerted by said pressure roller while such endless tread is retained on said head assembly.

9. A tread applying machine, according to claim 8, including a center stitching roller movable into and out of contact with the crown portion of the endless precured tread and a pair of side stitching rollers movable into and out of contact with the sidewall portion of the endless precured tread.

10. A tread applying machine comprising, in combination, a base, a tread assembly mounted on said base, cylinder means for moving said tread assembly along said base, said tread assembly including a bearing assembly, a head assembly mounted by said bearing assembly for rotation about an axis, said head assembly including a plate member having a plurality of radially extending threaded shafts mounted thereon, said tread assembly including a shaft mounted for rotation, a main gear mounted on said shaft, a plurality of follower gears mounted on said threaded shafts and meshing with said main gear, a finger assembly threadably mounted on each of said threaded shafts, whereby rotation of said horizontal shaft with respect to said plate member moves said finger assemblies radially inwardly or outwardly, said finger assemblies receiving and expanding a precured endless tread, tire mounting means mounted on said base in axially aligned relationship with said head assembly, said tire mounting means including rotatable chucking means for mounting a prepared tire casing for rotation about said axis, and roller means for joining an expanded precured endless tread on said tread assembly to a prepared tire casing on said tire mounting means while such tread and casing are simultaneously rotated.

* * * * *